United States Patent
Girard et al.

(10) Patent No.: US 7,160,582 B2
(45) Date of Patent: Jan. 9, 2007

(54) METHOD FOR FORMING ON A METALLIC SUBSTRATE A SULPHUR-FREE METALLIC COATING

(75) Inventors: Benoît Girard, Pessac (FR); Marie-Pierre Bacos, Antony (FR); Eric Berger, Cergy-le-Haut (FR); Pierre Josso, Issy les Moulineaux (FR)

(73) Assignee: Office National d'Etudes et de Recherches Aerospatiales, Chatillon (FR)

( * ) Notice: Subject to any disclaimer, the term of this patent is extended or adjusted under 35 U.S.C. 154(b) by 220 days.

(21) Appl. No.: 10/240,148

(22) PCT Filed: Mar. 26, 2001

(86) PCT No.: PCT/FR01/00906

§ 371 (c)(1),
(2), (4) Date: Oct. 22, 2003

(87) PCT Pub. No.: WO01/73163

PCT Pub. Date: Oct. 4, 2001

(65) Prior Publication Data

US 2004/0241833 A1    Dec. 2, 2004

(30) Foreign Application Priority Data

Mar. 29, 2000 (FR) .................................. 00 03975

(51) Int. Cl.
*B05D 1/18* (2006.01)
(52) U.S. Cl. .................. 427/437; 427/430.1; 427/435; 427/436; 427/8; 205/109; 205/255; 205/257
(58) Field of Classification Search ............ 427/430.1, 427/435, 436, 437, 8; 205/255, 257, 109
See application file for complete search history.

(56) References Cited

U.S. PATENT DOCUMENTS 4,305,792 A * 12/1981 Kedward et al. ........... 205/109
4,810,334 A *  3/1989 Honey et al. ............... 205/109

FOREIGN PATENT DOCUMENTS

JP    01 283377 A    11/1989
JP    01283377 A  *  11/1989

OTHER PUBLICATIONS

International Search Report of PCT/FR01/00906, dated Jul. 30, 2001.
International Preliminary Examination Report of PCT/FR01/00906, dated Feb. 20, 2002.
Patent Abstract of Japan, Publication No. 01283377, Published Nov. 14, 1989, in the name of Brother Ind Ltd.

* cited by examiner

*Primary Examiner*—Timothy Meeks
*Assistant Examiner*—Howard Abramowitz
(74) *Attorney, Agent, or Firm*—Christie, Parker & Hale LLP

(57) ABSTRACT

The invention concerns a method wherein the substrate (5) to be coated is immersed in an autocatalytic chemical deposit bath (4), for example nickel, contained in a stainless steel vessel (1) and wherein can be optionally mixed a suspended MCrAlY alloy, so as to form a metal deposit (nickel) wherein are optionally included powder particles. The invention is characterised in that, to provide a prolonged operation of the bath, it consists in measuring with a voltmeter (8) the difference of potential between the substrate (5) and a reference electrode (6) immersed in the bath (4), and in imposing between the substrate (5) and the vessel (1) an electric current produced by a generator (10), said current being adjusted by a regulator (11) so as to maintain said potential difference at a selected value.

21 Claims, 1 Drawing Sheet

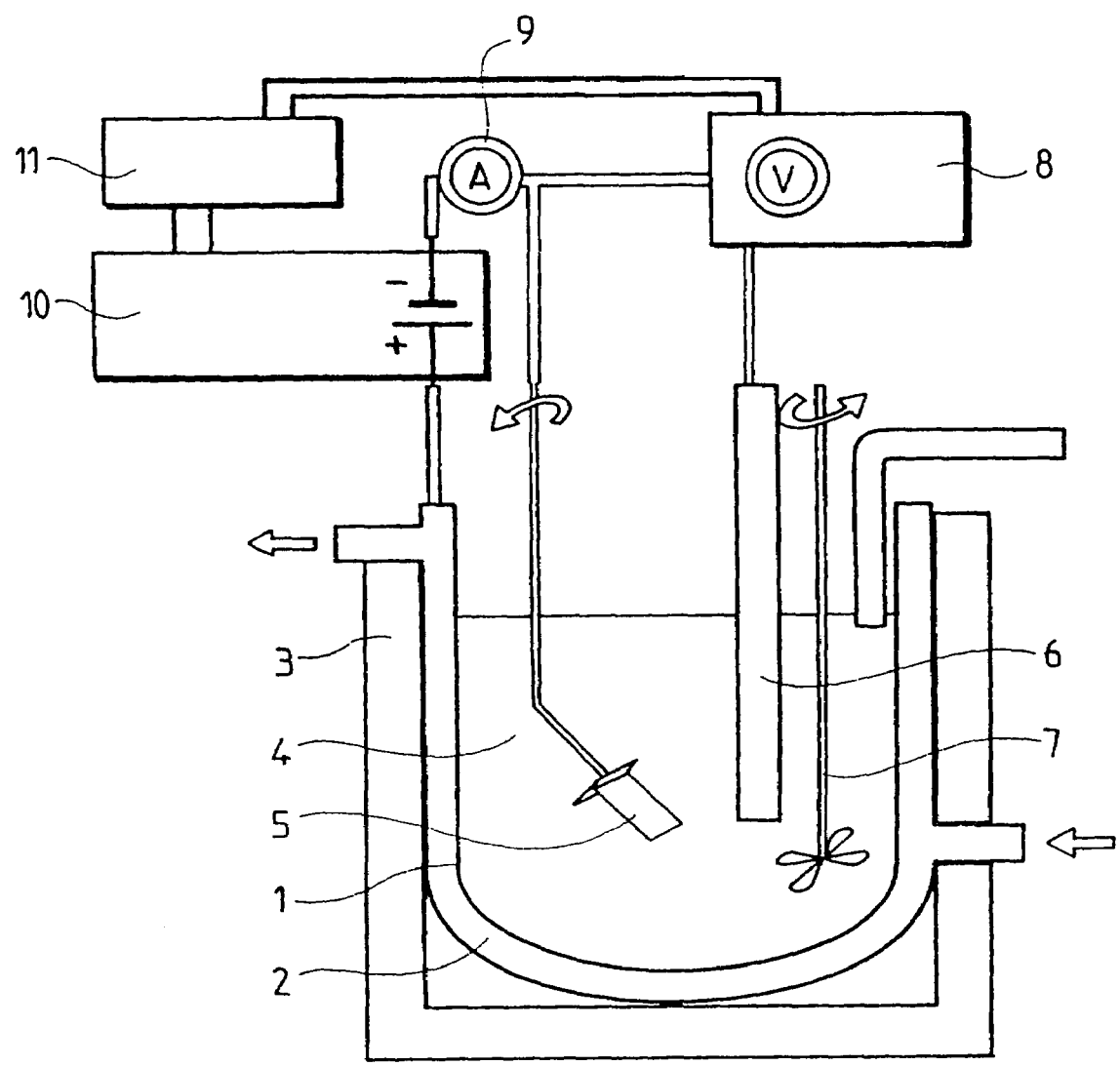

METHOD FOR FORMING ON A METALLIC SUBSTRATE A SULPHUR-FREE METALLIC COATING

CROSS-REFERENCE TO RELATED APPLICATION

This application is a National Phase Patent Application of International Application Number PCT/FR01/00906, filed on Mar. 26, 2001, which claims priority of French Patent Application Number 00/03975, filed Mar. 29, 2000.

This invention relates to a method for forming a coating on a metallic substrate, with a view, in particular, to protecting the substrate against corrosion and/or oxidation at high temperatures.

It is known to protect metallic components working at high temperatures, in particular aircraft turbine blades, against corrosion and/or oxidation by the use various coatings which are obtained by diffusion (essentially on the basis of nickel aluminium β-MiAl, which may be modified with additional elements). These coatings have numerous advantages, but they are limited in composition. For some applications, the "ideal" coating may have a chemical composition which is impossible to obtain by diffusion. This is why the projection of alloys such as those designated by the qualitative formula MCrAlY (where M=Ni and/or Co and/or Fe) has been studied using physical deposition techniques. These techniques enable traces (up to 2%) of so-called "active" elements such as yttrium, hafnium, tantalum and zirconium to be added to the deposit.

A typical example of a coating of MCrAlY consists of a nickel-based alloy containing 20% by weight of cobalt, which avoids the occurrence of the reaction:

$$\gamma\text{-Ni} + \beta\text{-NiAl} \rightarrow \gamma'\text{-Ni}_3\text{Al} + \alpha\text{-Cr},$$

possible above 1000° C., together with 20 to 25% chromium to reinforce type I corrosion resistance, with 6 to 8% aluminium (aluminising element) and about 0.5% yttrium which reinforces the adhesion of the alumina layer to the aluminising alloy. Its general microstructure is that of a bi-phase alloy containing precipitates of β-NiAl (aluminising phase) in a γ matrix. Depending on the working conditions required, other elements may be added, and/or the above concentrations may be modified. For example, if the coating will have to contend with type II corrosion under heat in the presence of vanadium, the concentration of chromium may exceed 30% by mass. Numerous compositions of MCrAlY are available commercially, those used most frequently being the ones known by the names AMDRY 997 (NiCoCrAlYTa) and AMDRY 995 (CoNiCrAlYTa).

A particularly relevant aspect of these protective alloys is the possibility of adding active elements to them. The addition in small quantities (of the order of 1 atomic % or less), of elements such as Y and Hf improves very substantially the adhesion of layers of $Cr_2O_3$ or $Al_2O_3$ on the alloys in question. As a result, the protective effect of the oxide layer is preserved for long periods, in particular under thermal cycling conditions.

Among the physical deposition techniques mentioned above for obtaining MCrAlY coatings, there may in particular be mentioned hot spraying, and more particularly plasma spraying, in which the material to deposit is introduced by means of a carrier gas into the jet of a plasma torch in the form of powder particles of 20 to 100 μm in diameter. After melting, the droplets of material, now liquid, are projected at high velocity on the surface of the substrate. The plasma flame results from the high velocity expansion, in a nozzle anode, of a plasmagenic gas (Ar+10% $H_2$, for example) which is ionised during its passage into an arc chamber. In this way, any material available in powder form which is able to be melted without either decomposition or evaporation can therefore be deposited on the surface of any substrate whatever. This spraying operation can be carried out either at atmospheric pressure (in air or in a neutral atmosphere), or under reduced pressure. In all cases, the coating is formed at high velocity, typically 100 μm/min. This deposition technique is highly directional, and therefore difficult to perform for components of complex form.

Plasma spraying under reduced pressure is essentially what is used for the deposition of alloys of the MCrAlY type. The spraying apparatus is installed in a chamber in which the pressure is greatly reduced (P=5 kPa). This enables oxidation of the sprayed alloy particles to be avoided, the velocity of the gases in the plasma jet to be increased, and the length of the flame to be increased, which increases the impact velocity of the melted particles, and as a consequence reduces porosity. Finally, it should be noted that this technique enables initial ionic scouring to be carried out by polarising the surface of the substrate, which increases the adhesion of the coating on the substrate. The deposits obtained are adherent, and slightly stretched, and may be very thick (a few millimeters). After spraying, the MCrAlY coatings are diffused in a heat treatment under vacuum. They are however rough, and require post-operative machining followed by burnishing.

We may also mention a technique of high velocity flame spraying, which is performed by causing a carburant (a hydrocarbon and/or hydrogen) to react with a combustion material (air reconstituted by a mixture of nitrogen and oxygen, or pure oxygen).

Another category of physical deposition methods is that consisting of vapour-phase physical depositions which comprise cathodic diode pulverisation and evaporation under an electron beam.

For cathodic triode pulverisation, a system with three electrodes polarised at several kilovolts and placed in a chamber, in which there is a vacuum of about $10^{-2}$ Pa, enables MCrAlY alloys which are extremely adherent, non-porous, and less directional than in the case of plasma spraying, to be deposited at a velocity between 5 and 25 μm/H.

For evaporation under electron beam, in a chamber maintained under a vacuum better than $10^{-4}$ Pa, an electron beam is focused on the surface of the material to be coated, contained in a cooled metal crucible. A system of continuous feeding from the ingot enables the level of the liquid bath to be kept constant and the deposition conditions to be kept constant. The vapours emitted condense on the substrate, which is placed facing the liquid bath. This substrate is held at a high enough temperature to minimise the errors inherent in the columnar growth of the deposit. These errors are then eliminated by granulation, followed by heat treatment to effect diffusion and eliminate tensile forces. The deposition velocities may reach as high as 25 μm/min. This technique is described in U.S. Pat. No. 5,698,273A. It was essentially developed for the deposition of MCrAlY on turbine blades. Its development is however limited because of high investment and exploitation costs. In addition, this highly directional method does not allow certain coating compositions to be easily obtained (in the case of alloys including elements with very different vapour pressures).

On the other hand, it does enable a coating to be formed which is protective and provides a thermal barrier (partially stabilised zirconia with yttria, $ZrO_2+8\%\ Y_2O_3$), the latter having better mechanical properties and better resistance to thermal shock than that obtained by plasma spraying.

Electrolytic deposition of the MCrAlY(Ta) alloy is impossible because it would pre-suppose the deposition, in an aqueous medium (water is no longer stable beyond −1V with respect to the normal hydrogen electrode), of nickel (EO=−0.44V), cobalt (EO=−0.28V), chromium (EO=−0.744V), aluminium (EO=−1.662V), yttrium (EO=−2.372V), and, if appropriate, tantalum (EO=−0.750V), in conjunction with each other. In order to obtain a MCrAlY deposit electrochemically, it would therefore be necessary to make a composite deposition comprising, firstly, nickel and/or cobalt, and secondly particles of CrAlY, and then to cause the whole combination of the electrolytic deposit+ particles+ high temperature substrate to diffuse (typically for 2 hours at 1100° C.). Examples of such a process are described in U.S. Pat. Nos. 4,305,792A, US 4,810,334A and 5,037,513A.

In the absence of electrolytic deposition, it is possible to cause particles to migrate in a strong electrical field (typically 100V). The deposition medium chosen must have a high dielectric constant and high electrochemical stability. This is electrophoresis. This technique, which is currently used for painting motor cars, enables particles to be deposited whether they are of metal or not. However, the deposit obtained is porous, friable, and has low adherence. It therefore has to be consolidated by a second deposit using a conventional method.

It is possible to perform chemical deposition, for example of nickel, cobalt, nickel-cobalt, nickel-boron, nickel-phosphorus, palladium, platinum or palladium-platinum, by an autocatalytic or chemical route (that is to say the deposition that catalyses the reduction reaction). Formation of the deposit is due to oxidation of a so-called "reducing" molecule, and to the reduction of a metallic cation in solution referred to as "metal to be deposited" or "electroactive salt". This type of deposition is known from the works of Brenner in 1946 [A. Brenner and G. Ridell, Proc. Amer. Electroplaters Soc. 33, 16 (1946); 34, 156 (1947)] for deposits of nickel-phosphorus or those of researchers at the companies Dupont-de-Nemours in the United States of America and Bayer in Germany in the case of nickel-boron. Various companies have since developed the concept and are commercially exploiting various baths for autocatalytic chemical deposit of nickel and/or cobalt: Bayer, Shipley, Frappaz Imaza, Apticote, Schlötter, etc. All of these commercial baths operate on the principle of depositing reducing agent/ metal. They also have another point in common: the stability (that is to say the absence of any deposit reaction other than on the surface of the substrate to be coated) is ensured for them by two distinct molecules: a primary stabiliser (as a general rule, arsenic pentoxide $As_2O_5$), for preventing spontaneous decomposition of the bath, together with a secondary stabiliser (lead acetate $CH_3CO_2Pb$; thallium sulphate $TlSO_4$; thiodiglycolic acid, etc.). Finally, depending on what reducing agents are used, the deposit obtained will contain phosphorus (sodium hypophosphite) or boron (sodium borohydride, dimethylaminoborane, etc.). The work of Josso et al between 1985 and 1989 showed that it was also possible to deposit, by autocatalytic chemical process, metals other than nickel and/or cobalt, namely platinum and/or palladium.

It has also been proposed to make a chemical deposition of at least one metal, in particular nickel and/or cobalt, from ions of that metal present in a bath, with inclusion of metallic particles in the deposit, in particular an alloy of the CrAlY or MCrAlY type, present in suspension in the bath. In this connection there seemed to be particular advantage in making use of an autocatalytic bath such as that described in FR 2 590 595A, containing nickel-II-tri(ethylenediamine) hydroxide, and/or cobalt-II-tri(ethylenediamine) hydroxide, with hydrazine as reducing agent and at least one stabiliser which is preferably chosen between arsenic pentoxide and imidazole, with the ethylenediamine acting as complexing agent. In this connection, such baths are free of sulphur compounds, and consequently avoid the presence of sulphur in the deposit. Now it is accepted that the sulphur present in trace form in the alloys or in the coatings is one of the causes of premature deterioration of protection against oxidation and corrosion under heat. Similarly, these baths are free of compounds of boron, phosphorus and silicon, and also free of brighteners and softeners containing carbon, which avoids the presence in the coating of these elements, which could be detrimental impurities. However, putting the powder to be co-deposited into suspension tends to cause destabilisation of the deposition bath. Although such destabilisation can initially be avoided by preliminary passivation treatment on the powder, when the bath is used for a long time with recharging, as is usual in the industrial process, depassivation of the powder and destruction of the bath are found to occur.

The object of the invention is to prolong the usefulness of the deposition bath, compatible with an industrial process.

In particular, the invention provides a method of forming a coating on a metallic substrate by chemical deposition of at least one metal from ions of the said metal present in an autocatalytic bath contained in a vessel.

According to the invention, at least the surface of the vessel in contact with the bath is electrically conductive and is connected to the positive pole of a current source the negative pole of which is connected to the substrate, and the intensity of the current source is regulated in such a way as to maintain at a selected level the potential difference between the substrate and a reference electrode immersed in the bath.

Optional features of the invention, complementary or alternative, are set forth below:
  particles are present in suspension in the bath and are included in the deposit.
  the diameter of the said particles is less than 15 µm.
  the said particles are formed of an alloy of the MCrAlY type.
  the alloy of the MCrAlY type contains tantalum.
  the deposition bath is a bath for deposition of nickel, and the element M in the alloy of the MCrAlY type comprises cobalt.
  the reference electrode has a support coated with a deposit obtained from the said bath.
  the support of the reference electrode is of an electrically conductive material which is resistant to corrosion in the bath.
  the potential difference between the substrate and the reference electrode is determined by means of a voltmeter (8), the input impedance of which is at least equal to $10^{12}\Omega$.
  the said surface of the vessel is of an electrically conductive material which is resistant to corrosion in the bath.
  the potential of the substrate is maintained between −1 V and 0V with respect to the reference electrode.
  the potential of the substrate is maintained in the region of −0.2V with respect to the reference electrode.
  the deposition bath is for practical purposes free of sulphur compounds.

the deposition bath is for practical purposes free of compounds of boron, phosphorus, and silicon.

the deposition bath is free of brighteners and softeners containing carbon.

the deposition bath is a bath for deposition of nickel and/or cobalt.

the deposition bath contains hydrazine as reducing agent.

the metal to be deposited is introduced into the bath in the form of a complex of a hyroxide of the said metal and of ethylene-diamine.

during the deposition operation, the intensity of the current flowing between the substrate and the vessel is measured.

during periods of inactivity of the bath, the vessel is positively polarised with respect to the reference electrode.

the deposition operation is followed by heat treatment in an atmosphere giving protection against oxidation, such as to render the coating homogeneous.

the deposition operation is followed by a thermal aluminisation treatment.

The invention also provides apparatus for performing the method as defined above, comprising a vessel having an electrically conductive internal surface, a reference electrode, an adjustable current source, means for controlling the potential difference between the substrate and the reference electrode and, optionally, to regulate the current source and the composition of the bath, and, optionally, means for maintaining particles in suspension in a bath contained in the vessel.

The invention further provides a component having a coating of an alloy of the MCrAlY type, such as can be obtained by the above method, wherein the element M consists of nickel and/or cobalt, the component having a sulphur content in the coating which is less than 50 ppm.

The component according to the invention may have the following features or some of them:

the sulphur content in the coating is less than 10 ppm.

the sulphur content in the coating does not exceed about 1 ppm.

the content of at least one of the elements B, P, Si and C in the coating is less than 50 ppm.

The features and advantages of the invention will be explained in greater detail in the following description with reference to the attached drawing, which shows diagrammatically an installation for the deposition step in the method of the invention.

Metallic depositions obtained by an autocatalytic chemical process work on the principle of depositing reducing agent/metal. If, in the absence of the metal to be reduced, an intensity-potential curve is drawn to describe the oxidation of the reducing agent in the depositing solution, and if in the same way a curve is drawn showing the variation, in the absence of the reducing agent, of intensity with respect to potential for the reduction of metallic cations in the same medium, it is found that the ordinates of the general curve obtained in the bath containing all its ingredients represents the sum of the corresponding ordinates of the two intensity-potential curves. Finally, if the concentrations of the various electro-active species present in the bath (reducing agent and cation to be reduced) are modified, and if the intensity-potential curves are drawn for each modification, it is found that the potential measured at I=0 is unvarying. This is the redox potential of the couple consisting of reduced metal and metal to be reduced, complexed in the bath under consideration. Since this potential is stable in the bath, it constitutes a reference potential which is independent of the non-zero concentrations of the electro-active species in the bath.

The installation shown by way of example comprises a vessel 1, of a material which is electrically conductive and which is impervious to corrosion by the deposition bath 4 and may for example be 18/8 stainless steel, with a rounded base having a jacket 2 for flow of a heat transfer fluid, together with a thermally insulating envelope 3. The substrate 5 to be coated, a reference electrode 6, and a rotary agitator 7, are plunged into the deposition bath 4 contained in the vessel. The electrode 6 includes a support of electrically conductive material impervious to corrosion by the bath 4, being for example of tungsten or, more preferably, stainless steel, and covered with a metallic coating of the same nature as the matrix of the deposit to be formed on the substrate 5, that is to say resulting from the reduction of the metallic ions contained in the bath.

A pH meter 8 acts as a high impedence input voltmeter, with its protected input, that is to say the input connected to the high resistance, being connected to the electrode 6, while its earthed input is connected to the substrate 5. The latter is also connected through an ammeter 9 to the negative pole of a stabilised current supply 10 controlled by a regulator 11. The positive pole of the generator 10 is connected to the vessel 1.

The installation shown enables a coating consisting of a matrix of the metal that results from reduction of the metallic ions contained in the bath, in which particles of a powder in suspension in the bath are coated, to be obtained.

The method of the invention, although not limited to the particular compositions of the substrate to be coated and the coating to be obtained, may with advantage be used for making coatings of alloys of the MCrAlY type, substantially free of sulphur and other impurities detrimental to nickel-based alloy components of turbo-machines for high temperature operation. The expression "of the MCrAlY type" means an alloy consisting mainly of the elements M (where this symbol represents nickel and/or cobalt and/or iron), Cr, Al and Y, including a dispersed phase of $\beta$ structure in a common matrix of $\gamma$ structure. Minor quantities of other elements, notably Ta and Hf, may be incorporated in it.

In order to homogenise this coating, the invention provides a heat treatment whereby reheating causes the constituents to diffuse among themselves. On the industrial scale it is preferable to carry out this reheating in a reducing atmosphere, in such a way as to avoid any oxidation of the component being treated, either by oxygen or by water vapour arising from any leaks. Such a reducing atmosphere may consist of hydrogen, with the optional addition of an inert gas such as argon, up to a limit of 90% by volume.

In addition, the coating may preferably be subjected to an aluminisation or chrome-alumination treatment, such as those which are described in FR 1 490 744A, 2 094 258A, 2 276 794A and 2 638 1 74A, in order to reinforce the $\beta$ phase of the alloy of the MCrAlY type. Such a treatment may be carried out after or before the reheating mentioned above. In another version, the aluminisation treatment may be applied in a reducing atmosphere directly after the deposition, diffusion of the atoms in the coating being obtained during this treatment.

The invention is further illustrated by a few non-limiting examples which are described below.

EXAMPLE 1

It is proposed to use, for the deposition of nickel-boron, a commercial solution known under the name of NIBODUR, sold by the Company Schlötter. Preparation of the bath consists in diluting the concentrate, bringing it to a temperature of 90 to 92° C. after having adjusted the "reducing agent 1098" (sodium hydride-boride or boron hydride, $NaBH_4$). If the concentration of the latter is maintained approaching 0.3 g/l, the rate of deposition will be in the range between 20 and 25 µm. A stainless steel plate is in this way given a nickel-boron deposit about 5 µm thick (this thickness is necessary and sufficient for known percolation of any porosities to occur which would bring the substrate into contact with the depositing solution). In parallel, another solution of NIBODUR nickel-boron solution is made in an 18/10 stainless steel vessel. This solution is brought to 80° C. A component made of electrically conductive material is introduced into it and connected to the negative pole of a current source. As to the vessel, this is connected to the positive pole of the same current source. The steel plate, already coated with a nickel-boron deposit, is connected to the component to be coated through a pH meter which acts as a high-impedance input voltmeter. This coated steel plate will serve us as a reference electrode, using the redox potential $Ni/Ni(ED)^{2+}{}_3$. This potential is easy to calculate with respect to the normal hydrogen electrode. Given that for an initial nickel concentration of 0.14 M (or 8 g/l of nickel), the concentration of Ni in the presence of ethylenediamine is $2.8 \times 10^{-15}$ M, the apparent (or Nernst) potential is -0.75 V/NHE (normal hydrogen electrode). After addition to this solution of 0.1 g/l of sodium boron hydride, a slight amount of activity appeared (formation of hydrogen bubbles), both in the vicinity of the reference electrode and in the vicinity of the components being coated. The samples were subsequently polarised at -200 mV with respect to the reference electrode, that is to say 0.95 V/NHE. It is then found that the activity in the vicinity of the samples being coated has greatly increased, while that of the reference electrode has stayed constant. The electric current passing through the cell is of about 100 mA for a surface area of about 0.3 dm² treated. The rate of deposition obtained is about 20 µm/h, that is to say a deposition rate identical to that obtained under "normal" conditions. Once this over-voltage is raised, the chemical deposition activity in the region of the substrate becomes small.

This operation shows that it is possible to make use of any chemical bath whatsoever under conditions of optimal stability, on condition that there is defined in it a reference electrode consisting of a substrate on which a deposition reaction has taken place. The potential of this electrode will be dependent on the metal (or alloy) to be deposited (Ni, Co, Pt, Pd, etc.), on the complexing agents used, and on the nature of the reducing agent used. Once these conditions have been defined, it is necessary and sufficient to reduce the deposition temperature and the concentration of the reducing agent. Regulation of the potential provides the forces required for deposition. This system is adaptable to all autocatalytic chemical baths on condition that the substrate is an electrical conductor.

EXAMPLE 2

A nickel solution, derived from that described in FR 2 590 595A, is made by the oxalate method. This solution, which is called the mother solution, is dosed with about 44 g/l of nickel (0.75 M). By dilution of this solution, a solution is prepared for the autocatalytic chemical deposition of nickel, the composition of which is as follows:

| | | |
|---|---|---|
| Nickel-II-tri (ethylenediamine) hydroxide | $Ni(H_2N(CH_2)_2NH_2)O_3OH_2$ | 0.2 mol.l$^{-1}$ |
| Sodium hydroxide | NaOH | 0.5 mol.l$^{-1}$ |
| Arsenic pentoxide | $As_2O_5$ | $6.5 \cdot 10^{-4}$ mol.l$^{-1}$ |
| Imidazole | $N_2C_3H_4$ | 0.3 mol.l$^{-1}$ |

To this solution there is added about 50 g.l$^{-1}$ of powder of a CoCrAlYTa alloy having the following composition by weight, and having a particle diameter of less than 15 µm:

| | |
|---|---|
| Co | 39.3% |
| Cr | 35.7% |
| Al | 16.1% |
| Ta | 7.8% |
| Y | 1.1% |

A component 5 of nickel-based superalloy, to be coated, is introduced into the deposition solution 4 contained in the vessel 1, and is brought to 80° C. at the same time as 10 ml.l$^{-1}$ of hydrated hydrazine is added to it. This sample is then brought to a potential of -200 mV/(Ni/Ni(HY)$_6{}^{2+}$), Ni/Ni(HY)$_6{}^{2+}$, representing the reference electrode that consists of the stainless steel plate 6 when in the course of being coated with an autocatalytic chemical deposit of pure nickel. The normal potential of this electrode with respect to a normal hydrogen electrode (NHE) is -1.268 V/NHE. The deposition potential is then about -1.5 V/NHE. For this purpose, the signal produced by the pH meter 8, representing the potential difference between the substrate 5 and electrode 6, is passed to the regulator 11, which adjusts the supply voltage produced by the generator 10 in such a way as to maintain the potential of the substrate at the required value. The agitator 7 ensures that the bath is homogeneous and maintains the powder in suspension, the curved form of the base of the vessel preventing any accumulation of powder taking place. As to the temperature of the bath, this is maintained by circulation of hot fluid within the jacket 2. A composite deposit is thus formed at the rate of 25 µm/h, and contains 25% by volume of CoCrAlYTa. The current flowing between the component 5 and the vessel 1, measured by means of the ammeter 9, gives an indication as to the development of the composition of the bath, which can be made use of to recharge the latter when necessary.

In another version, the agitator 7, where made of an appropriate material, for example stainless steel, may also fulfil the function of a reference electrode, after having been coated with an autocatalytic chemical deposit from the bath 4, which dispenses with the use of the electrode 6 and simplifies the apparatus.

In addition, during rest periods of the bath, that is to say when no substrate to be coated is immersed in it, the reference electrode may serve to protect the vessel 1 from parasitic nickel deposits, being connected to the negative pole of the generator 10 instead of the substrate 5, with the voltage produced by the generator being for example 1 volt.

The coated component is then placed in a semi-sealed nickel box containing granules of an alloy of chromium and aluminium, with 30% by mass of aluminium and ammonium bifluoride ($NH_4F$, HF) in a concentration of 1% by weight of the quantity of the chromium-aluminium alloy without which there would be contact between the substrate being treated and the cement. After a purge of the atmosphere in the box by argon at ambient temperature, the apparatus is placed for 16 hours in a vertical oven brought to a temperature of 1050° C. and filled with a pure hydrogen atmosphere. At the end of this treatment, the component to be protected has a coating of constant thickness, despite having a complex geometric form. The coating is an aluminised NiCoCrAlYTa, that is to say it has a superficial layer of β-NiAl. An analysis carried out on this coating shows that its sulphur resistance is very much reduced, being of the order of 1 ppm. Its oxidation and corrosion properties under heat in the presence of condensed phases such as melted sodium sulphate are excellent, as is shown by a test comprising 1000 thermal cycles in which the sample was exposed to a temperature of 1100° C. for one hour in each cycle.

EXAMPLE 3

The chemical deposition step as described in example 2 is reproduced. The coated component is then placed in an aluminium-yielding cement having the following composition by weight:

| Alumina | $Al_2O_3$ | 50% |
| Chromium | Cr | 42.5% |
| Aluminium | Al | 7.5%, | with the addition of ammonium chloride ($NH_4Cl$) in the proportion of 1% of its total mass, and contained in a box of semi-sealed nickel. The whole is brought to the temperature of 1050° C. for 16 hours in a pure hydrogen atmosphere. The coating so obtained has the same features as those described in example 2.

EXAMPLE 4

We proceed as in example 3, but the composition of the cement and the heat treatment conditions are modified, in such a way as to replace the low activity aluminisation with a high activity aluminsation. The composition of the cement by weight is as follows:

| Alumina | $Al_2O_3$ | 50% |
| Chromium | Cr | 32.5% |
| Aluminium | Al | 17.5%, | with, here again, 1% of ammonium chloride. The coated component, immersed in this cement, is heated at a temperature of 750° C. for seven hours in a pure hydrogen atmosphere. After cooling, a homogenising reheating step is carried at 1085° C. under hydrogen for five hours. A coating is obtained which has the same characteristics as those described in example 2.

EXAMPLE 5

The chemical deposition step described in example 2 is reproduced. The coated component then undergoes the treatment described in example 1 of FR 2 638 1 74A, comprising (a) the electrolytic deposition of a palladium-nickel alloy, (b) a diffusion heat treatment of two hours at 850° C. in a vacuum, and (c) a conventional high activity aluminisation treatment in an enclosed activated cementation step with post-diffusion. In this way, a coating of NiCoCrAlYTa alloy is obtained which is reinforced by aluminsation modified with palladium, of which the properties of purity, oxidation resistance and corrosion under heat are as mentioned in example 2. In a modified version it is possible to reinforce the coating of MCrAlYTa with platinum and/or rhodium, for example using the treatment described in U.S. Pat. No. 3,999,956A.

EXAMPLE 6

It is proposed to renovate an aluminium oxide coating without removal of the old coating. After degreasing, the component of a hot part of a turbo-machine is de-oxidised and de-sulphided in the manner generally carried out by the person in the art. After these operations, the component receives a preliminary deposit of nickel in a hydrochloric medium (Wood nickel), and after thorough rinsing, it is treated as in example 2. A coating is obtained which has the same characteristics as those described in example 2.

EXAMPLE 7

It is proposed to form a coating having an increased yttrium content. To this end, the procedure as in example 3 is carried out except that, besides 50 $g.l^{-1}$ of CoCrAlYTa alloy powder, 10 $g.l^{-1}$ of yttria ($Y_2O_3$) with similar granular characteristics is put in suspension in the bath. At the end of the deposition obtained at the rate of 25 $\mu m.h^{-1}$, a metallographic cross section shows that the powders are included within the ultra-pure nickel deposit. The sample is, at the end of the composite chemical deposition, covered with a thick palladium-nickel alloy deposit of about 8 μm. The whole is then put in an oven under a vacuum of better than $10^{-3}$ Pa, and repeated for two hours at 850° C. At the end of this reheating step, the sample is aluminised using a so-called high activity cement such as is described in example 4. After the heating at 1085° C. necessary to tranform the δ-$Ni_2Al_3$ into β-NiAl, a coating of NiCoCrAlYTa reinforced with palladium and yttrium is obtained, of which the properties of purity, oxidation resistance and corrosion under heat are as described in example 2.

The invention claimed is:

1. A method of forming a coating on a metallic substrate (5) by chemical deposition of at least one metal from ions of the said metal present in an autocatalytic bath (4) comprising a reducing agent contained in a vessel (1), with an electrically conductive surface connected to the positive pole of a current source (10), the negative pole of which is connected to the substrate, the method characterized in that the intensity of the current source is regulated in such a way as to maintain the potential of the substrate (5) between −1V and 0V with respect to the potential of a reference electrode (6) immersed in the bath, the potential of the reference electrode being equal to the redox potential of the at least one couple consisting of reduced metal and metal to be reduced complexed in the bath (4).

2. A method according to claim 1, wherein particles are present in suspension in the bath and are included in the deposit.

3. A method according to claim 2, in which the diameter of the said particles is less than 15 μm.

4. A method according to claim 1, wherein the said particles are formed of an alloy of the MCrAlY type.

5. A method according to claim 4, wherein the alloy of the MCrAlY type contains tantalum.

6. A method according to claim 4, wherein the deposition bath is a bath for deposition of nickel, and the element M in the alloy of the MCrAlY type comprises cobalt.

7. A method according to claim 1, wherein the reference electrode has a support coated with a deposit obtained from the said bath.

8. A method according to claim 7, wherein the support of the reference electrode is of an electrically conductive material which is resistant to corrosion in the bath.

9. A method according to claim 1, wherein the potential difference between the substrate and the reference electrode is determined by means of a voltmeter (8), the input impedance of which is least equal to $10\Omega$.

10. A method according to claim 1, wherein the said surface of the vessel is of an electrically conductive material which is resistant to corrosion in the bath.

11. A method according to claim 1, wherein the potential of the substrate is maintained in the region of 0.2V with respect to the reference electrode.

12. A method according to claim 1, wherein the deposition bath is for practical purposes free of sulphur compounds.

13. A method according to claim 1, wherein the deposition bath is for practical purposes free of compounds of boron, phosphorus, and silicon.

14. A method according to claim 1, wherein the deposition bath is free of brighteners and softeners containing carbon.

15. A method according to claim 1, wherein the deposition bath is a bath for deposition of nickel and/or cobalt.

16. A method according to claim 1, wherein the deposition bath contains hydrazine as reducing agent.

17. A method according to claim 1, wherein the metal to be deposited is introduced into the bath in the form of a complex of a hyroxide of the said metal and of ethylenediamine.

18. A method according to claim 1, wherein, during the deposition operation, the intensity of the current flowing between the substrate and the vessel is measured.

19. A method according to claim 1, wherein, during periods of inactivity of the bath, the vessel is positively polarised with respect to the reference electrode.

20. A method according to claim 1, wherein the deposition operation is followed by heat treatment in an atmosphere giving protection against oxidation, such as to render the coating homogeneous.

21. A method according to claim 1, wherein the deposition operation is followed by a thermal aluminisation treatment.

* * * * *